April 21, 1953 — W. H. MEAD ET AL — 2,635,745
APPARATUS FOR SEPARATING A MIXTURE OF GRANULAR
OR COMMINUTED MATERIALS BY AIR SUSPENSION
Filed Oct. 7, 1947 — 3 Sheets-Sheet 1

INVENTORS
WILLIAM H. MEAD
LEWIS H. BISHOP
J. STANLEY FINN
BY
ATTORNEY

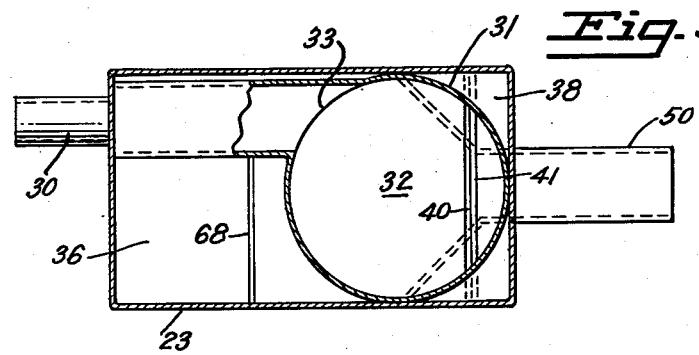
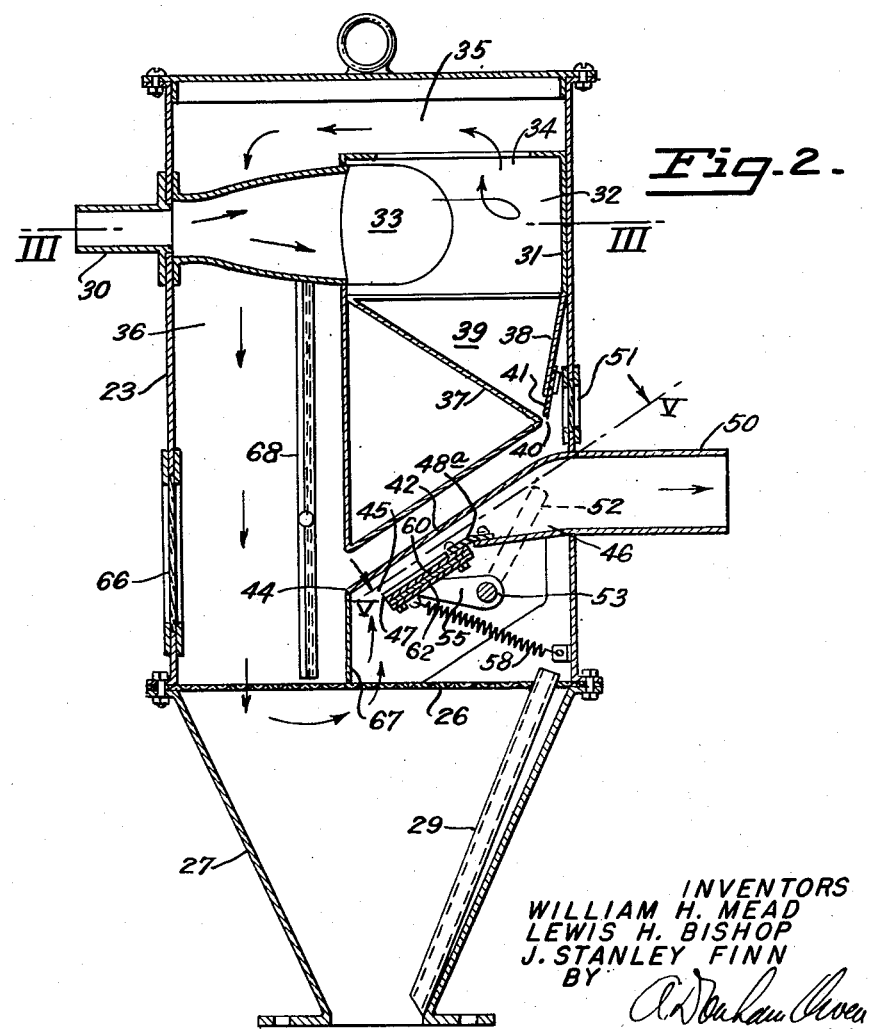

April 21, 1953 W. H. MEAD ET AL 2,635,745
APPARATUS FOR SEPARATING A MIXTURE OF GRANULAR
OR COMMINUTED MATERIALS BY AIR SUSPENSION
Filed Oct. 7, 1947 3 Sheets-Sheet 3
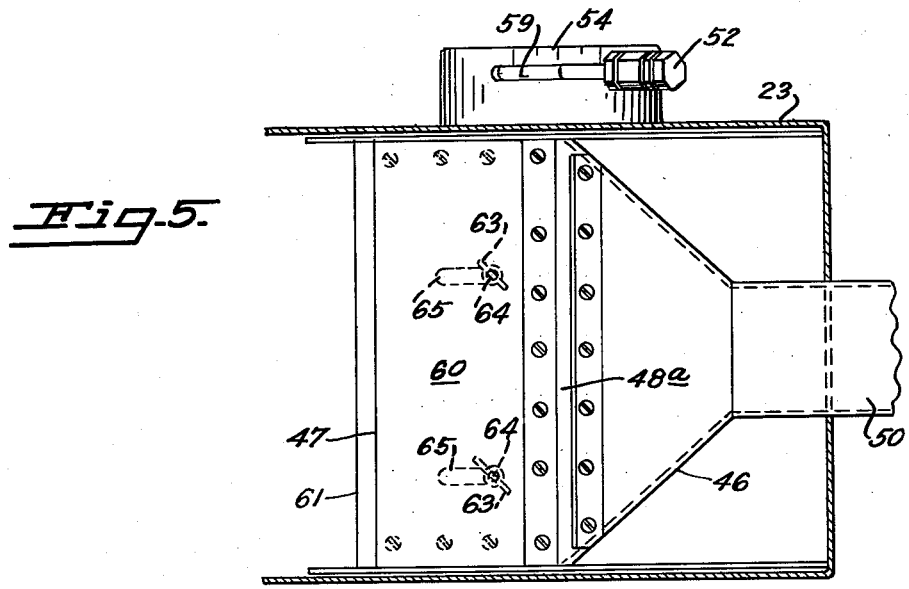
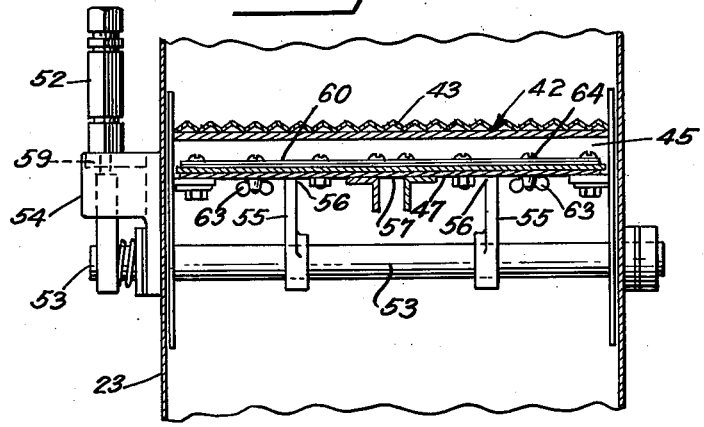
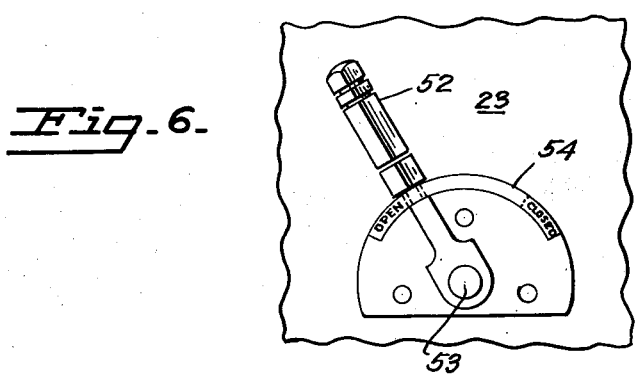
INVENTORS
WILLIAM H. MEAD
LEWIS H. BISHOP
J. STANLEY FINN
BY
ATTORNEY Patented Apr. 21, 1953

2,635,745

UNITED STATES PATENT OFFICE 2,635,745

APPARATUS FOR SEPARATING A MIXTURE OF GRANULAR OR COMMINUTED MATERIALS BY AIR SUSPENSION

William H. Mead, Oakland, and Lewis H. Bishop and John Stanley Finn, Burlingame, Calif., assignors, by mesne assignments, to said Mead Application October 7, 1947, Serial No. 778,378

5 Claims. (Cl. 209—35)

1

This invention relates to a an apparatus for separating into its conponents a continuously circulating mixture of two or more granular or comminuted materials, some of which have different specific gravities.

It is contemplated that this invention will prove particularly useful in connection with a surface treating apparatus of the kind described in application Serial Number 608,386, filed August 2, 1945, which issued as Pat. #2,455,514 and was reissued as Re. 23,186, for this present invention makes it possible to separate and to reclaim in a continuous operation the valuable abrasive or treating materials from the worthless refuse or dust which is drawn off with it from the surface being treated.

The surface treating apparatus to which we refer draws off the mixture of treating material and waste in a powerful suction current after the blasted abrasive has impinged at the work surface with an induced air current which flows in through a perforate ring around the tool head. One problem which arises in connection with its use, is that of providing a grit reclaimer which will work under extreme low-pressure conditions. Another problem is that of providing a reclaimer which will work quickly and continuously, so that it can be used to keep the machine supplied with plenty of treating material without periodic shutdowns. Another practical problem is to provide a reclaimer which can be regulated to suit the many different kinds of abrasive and waste encountered. One further problem is to make the process of separation observable so that the operator may watch while it is in operation and set the device for its most efficient operating condition.

One important object of the invention is to provide a grit reclaimer which will operate in a continuous cycle under very low pressure or vacuum conditions when separating two solid materials, e. g. grit from refuse.

Another object of our invention is to provide a grit reclaimer which employs as a separating agent the same suction current which is used to convey the material into the separator.

Another object of this invention is to provide a method and apparatus by which a mixture of granular or comminuted materials, one or several of which are heavier than the others, can be separated into its components.

Another object of the invention is to provide a separating device which can be adjusted for use with different materials or different sized particles of the same materials.

2

Another object of the invention is to make the separating process observable.

Another object of this invention is to provide an apparatus capable of separating two intermixed fine-particle materials of different specific gravity.

Another object of the invention is to provide a grit reclaimer of a type which will reduce the likelihood of contaminating the grit with the refuse.

A further object of the invention is to provide a grit reclaimer which will work efficiently aboard ship and in similar conditions where its position is not always upright.

Other objects and advantages of the invention will appear from the following description. A preferred example is described, in conformity with U. S. Revised Statutes Section 4888. It is not intended thereby to limit the invention except as defined by the claims. Although the apparatus is described as a grit reclaimed, it should be understood that "grit" includes all abrasives— metal, grit, shot, sand, rice hulls, walnut shells, and other treating materials as well, and also that the method is applicable to separate any relatively heavy material from other relatively light materials.

In the drawings,

Fig. 2 is a view in elevation and in section of a modified form of grit reclaimed similar in most respects to the one shown in Fig. 1;

Fig. 3 is a view in section taken on the line III—III in Fig. 2;

Fig. 4 is a view in elevation and in section taken along the line IV—IV in Fig. 1;

Fig. 5 is a view looking down along the line V—V in Fig. 2;

Fig. 6 is a view of the handle which controls the adjustable lip on the refuse exhaust regulator.

Figure 1:
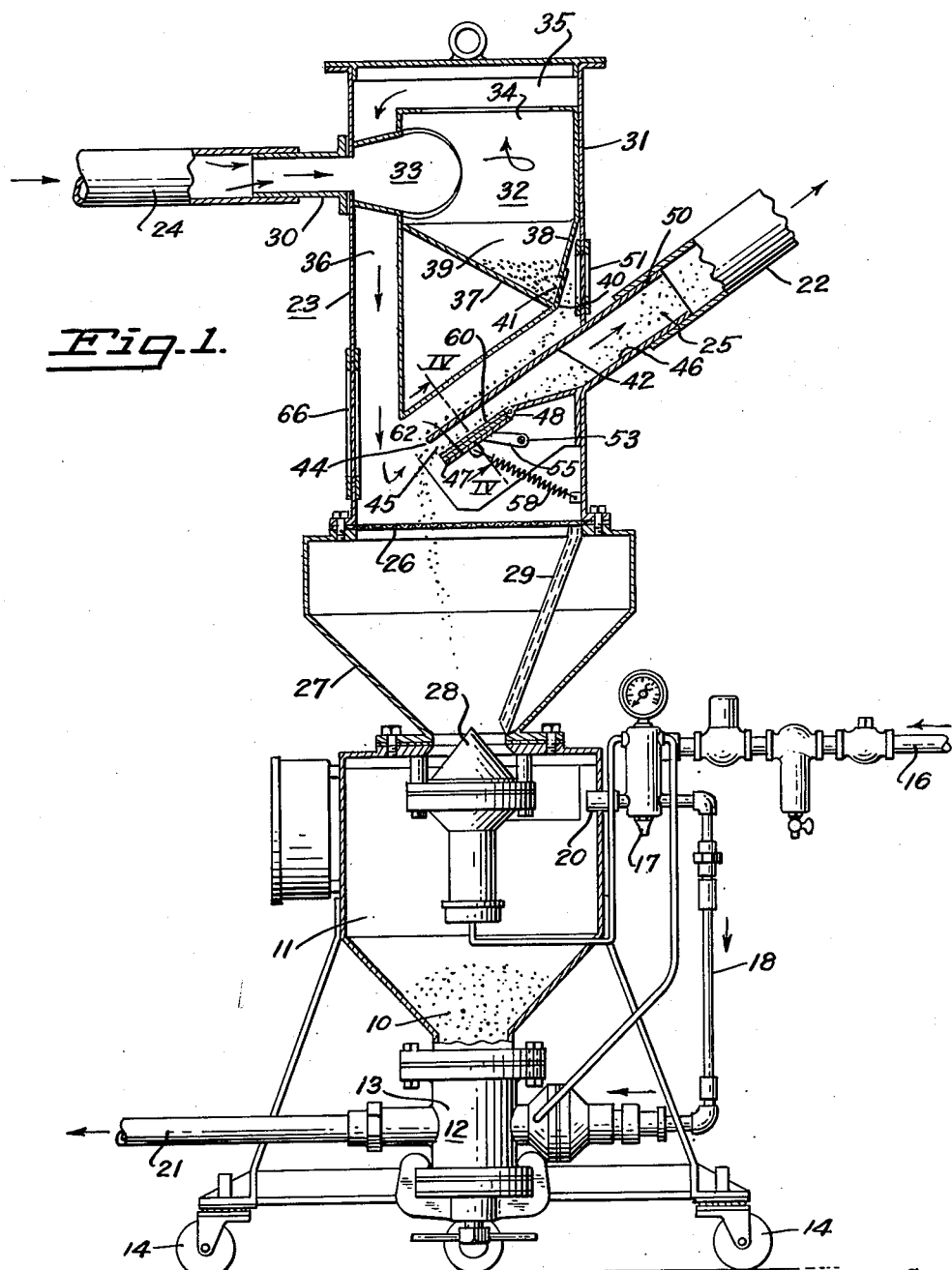
Fig. 1 is a view in elevation, partly in section, of a portion of a surface treating device, including a grit reclaimer embodying my invention and a feed hopper, a feed valve, and pressure and suction lines.

Broadly considered, our invention includes a cylindrically-walled expansion chamber or cyclone 32 into which an air stream containing the intermixed materials is introduced through an inlet 33 in the wall 31 of the cyclone 32. The intermixed solids are shaken out of the air stream as it decelerates and they settle on an inclined bottom plate 37 beneath the cyclone 32 while the air stream passes up and out through an opening 34 in the top of the cyclone 32 into a series of passageways 35 and 36 preferably of substantially constant cross-sectional area. The solids fall through a narrow slit or perforation 40 at the lowest point of the inclined floor 37 on to a reversely-inclined corrugated slide 42. Beneath the bottom edge 44 of the slide 42, where the mixture falls off the slide, is a duct 46, which preferably has a lip 47 that can be lengthened or shortened to bring it closer or farther from the falling mixture or the lip can be swung about a pivot to widen or narrow the opening of the duct 46. In this area, the air current passes from the passageway 36 laterally or across through the falling mixture into the duct 46. As it does so, the solid particles of lower specific gravity are carried by the air stream into the duct 46. The particles of higher specific gravity have too much inertia to be deflected or carried into the duct 46, and drop on below the opening 45 of the duct 46, and eventually fall into the collecting bin 27. A screen 26 removes any coarse waste that may have been too large to be blown into the duct 46.

When a fine abrasive is being treated, a drop plate 67 is suspended from the front edge of the slide 42, and the air current passes down below the opening 45 and must blow upwards into it, so that only the light particles of refuse are carried into the duct 46.

In Fig. 1, the device is illustrated in connection with the grit feeding portion of a surface treating apparatus. The grit 10 is originally stored in the hopper 11, from which it falls into the housing 12 of a feed valve 13, preferably of the type described and claimed in co-pending application, Serial Number 55,243, filed October 18, 1948, now Pat. #2,521,931, which was a continuation-in-part of application Serial Number 768,198, filed August 12, 1947, now abandoned. This apparatus shown in Fig. 1 is movably mounted on wheels 14, but it may be stationary, or mounted on skids or in some other manner, so far as the present invention is concerned.

The pipe 16 is a conductor of compressed air which, after passing through several valves, strainers, etc., none of which is material to this invention, is divided at the valve 17 to flow into the two conduits 18 and 20. The conduit 18 connects with the feed valve 13, and the conduit 20 connects with the hopper 11 to equalize the pressure inside the hopper 11 with that in the feed valve 13. The air blast through the valve 13 picks up the grit 11 and carries it out through the conduit 21, to the operating head (not shown), where it is blasted against the surface and removes therefrom waste material 25, such as rust, sawdust, paint, varnish, or other unwanted coating. A powerful air pump (not shown), simultaneously exerts a suction force through the conduit 22, the housing 23 of the grit reclaimer, and the conduit 24, which is connected to the operating head, to withdraw from the working area the used grit 10 and the waste materials 25 which are by that time mixed with the grit 10.

This reclaimer is used in the suction circuit under the low pressure conditions prevailing there to separate the grit 10 from the waste 25 in a continuous cycle. It feeds the grit 10 to the hopper 11, and passes the waste 25 out through the conduit 22 to a refuse collector which is not shown here. The reclaimed grit 10 can be used over and over several times, and there is no need to stop the apparatus to reload it with new grit until the old grit is completely expended.

The grit 10, when separated from the waste, falls through a screen 26 into a bin 27 which is kept at the same pressure as the reclaimer by the vent pipe 29. A dump valve 28 at the bottom of the bin 27 remains closed while the tank 11 is under pressure greater than atmospheric and the bin 27 is under a vacuum condition. It opens when the air pressure in the hopper 11 is reduced. When the valve 28 is closed, the grit 10 stores up in the bin 27, and is ready to fall into the hopper 11 when the valve 28 opens. Details of the dump valve 28 need not be described here, as it is already described in copending application S. N. 608,386.

In the reclaimer the unseparated mixture is carried by the air stream into the grit reclaimer 23 through the conduit 24 which is attached to an inlet fitting 30 near the top of the housing 23. Part of this inlet fitting 30 is preferably of a smaller diameter than the conduit 24 so that it may act as a nozzle to speed up the velocity of the air stream. From there the air stream carries the mixture through the opening 33 in the cylindrical wall 31 and into the cyclone chamber 32.

The cyclone 32 is a cylindrical expansion chamber, preferably made of or lined with a very hard grit-resistant surface and mounted removably near the top of the housing 23. As the air current goes around the cyclone, it slows down because the chamber is so much larger than the size of the fitting 30. A certain turbulence comes, too, when the circular air current passes the inlet opening. This agitation and reduced momentum allows the air stream to drop practically all the solids it carried into the cyclone before the air stream passes out through the opening 34 in the top of the cyclone.

The air stream empties into the lateral passageway 35, and then down into the vertical passageway 36. These passageways 35 and 36 have substantially the same cross-sectional area, so that the velocity of the air stream in them will remain about constant. This constant velocity has the important effect of keeping in the air stream any material which it may have carried out of the cyclone 32. Particles of grit are generally too heavy to be carried out of the cyclone 32, and the particles of light refuse 25 which may be carried out of the cyclone by the air stream usually pass up the exhaust duct 46 instead of falling into the bin 27 with the grit 10.

The floor 37 of the grit pot 39 below the cyclone chamber 32 slopes away from the passageway 36 toward the other side of the housing 23 and another shorter wall 38 slopes in toward it from the housing wall 23. The two walls 37 and 38 converge toward a narrow slit or perforation 40, across which we prefer to have a flapper or gate 41 made of some elastic material. This flapper will be forced open from time to time by the weight of the mixture above it, but otherwise it keeps the slit 40 substantially closed, so that almost no air current passes through it, but goes out the opening 34.

An observation window 51 (see Fig. 2) may be placed opposite the gate 41 so that during operation it is possible to see whether the grit and dust mixture are passing satisfactorily.

The mixture of solids, after being dropped out of the air current in the cyclone 32, falls on to the inclined floor 37 and slides toward the opening 40. From time to time the flapper 41 opens and lets the solids fall through on to the slide 42.

The slide 42 is inclined in the opposite direction to the floor 37, and is preferably corrugated or serrated, having longitudinal troughs 43 (see Fig.

4) so that the mixture will be rather evenly distributed over the slide 42 even when the reclaimer is tilted. This feature becomes an important one aboard ship, for it tends to spread out the sliding mixture evenly, a thing which would be impossible if the mixture poured back and forth across the slide 42. As the mixture moves down the slide 42, the smaller particles 25, which are the waste dust-like particles, tend to settle toward the bottom layer and the larger particles 10, which are mainly the abrasive, tend to rise to the top. When the mixture falls over the edge 44, the abrasive 10 tends to fall with a larger trajectory than the waste 25. The waste tends to fall on the side nearer the mouth 45, where it is more easily picked up by the air stream passing into the mouth 45.

In the device as illustrated in Fig. 1, the passageway 36 extends down opposite the mouth 45 of the duct 46. A powerful suction pump is connected through the conduit 22 to the duct 46 and draws the waste 25 into a refuse collecting tank. The air path is from the passageway 36 into the duct 46, so that it passes laterally through the falling mixture. The heavier particles 10 of the mixture come under the influence of this air stream, but possess sufficient inertia to fall past the lower lip 47 of the mouth 45 and drop down on to the screen 26 instead of into the mouth 45. The lighter waste 25 is more easily influenced by the airstream and moves into the duct 46 through the mouth 45 and out through the conduit 22 to the waste collection tank.

The mouth 45 of the duct 46 extends the width of the reclaimer housing 23. Back of it the passage narrows toward a round fitting 50, and, since the velocity of the air stream increases as the passage narrows, once the waste 25 is picked up it will not be dropped out of the air stream.

The lip 47 is made adjustable in two ways, so that it may be set to act properly with any given air current and any given type of grit. In the first place the velocity of the air stream through the falling mixture may be changed by swinging the lip 47 up or down. The wider the mouth 45 is open, the slower will be the velocity of the air stream at that point. The entire lip 47 is pivoted on a hinge 48 with the usual pintle (see Fig. 1) or on a resilient hinge member 48a of fabric or leather (see Figs. 2 and 5) which is fastened both to the lip 47 and to the duct 46. The handle 52 outside the chamber is attached to the shaft 53, which rides in a slot 59 in the calibrated dial plate 54. The two cams 55 inside the chamber are keyed to the shaft 53 and their rounded cam ends 56 bear on the bottom 57 of the lip 47. A spring 58 holds the lip 47 against the cams.

The other adjustment which can be made is to lengthen or shorten the lip 47 by sliding the top plate 60. In this way the edge 61 can be moved into the best position with respect to the falling mixture to capture the most waste. This adjustment is preferably made while the machine is at rest. There is a wing nut 63 on the bolt 64 which fits in the slot 65 and holds the slide plate 60 rigidly against the lip base plate 62. By loosening this nut 63 the plate 60 may be slid into a new position and the nut again tightened.

An observation port 66 (see Fig. 2) allows the operator to check on how the separation of the grit and refuse is proceeding. In this way he can make adjustments of the lip 47 and the handle 52 best suited to the velocity of the suction current and to the weight of the abrasive materials being used.

Where very fine abrasive is used, the modifications shown in Fig. 2 are preferably employed. There a drop plate 67 is suspended from the edge 44 to separate the falling mixture from the mouth 45. At the same time another partition 68 extending across the housing 23 and down close to the screen 26 makes the air current take a more circuitous route, as shown by the arrows in Fig. 2. The plate 67 preferably extends down to the screen 26. This means that the mixture will fall through the screen 26 into the chamber 27 before the lighter waste particles come under the influence of the air current sweeping down the duct 36 through the screen 26 and back up to the mouth 45 and into the duct 46. The heavier grit 10 has sufficient momentum to keep it from being blown back up through the screen 26 by the air current. The light dust and waste, on the other hand, is easily carried back up into the duct 46.

With this device, the whole separating operation is continuous. It is done under reduced pressure in a totally enclosed machine. Also the same stream of air which conveys the mixture in, is diverted and carries the dust and refuse out to its dump bin. By means of the flapper 41 and the controls at the mouth 45, the above device achieves an exceptional result in the continuous separation and recovery of treating materials from the refuse picked up on the treated surface.

What is claimed is:

1. In a device for continuously separating comminuted materials of different specific gravities which enter said device in suspension in an airstream, the combination of: a closed housing; an expansion and whirl chamber within said housing, having an opening in its upper end and a sloping floor at its lower end; an air inlet pipe passing through the wall of said housing and into said chamber for carrying said air stream into said chamber, the solid materials being therein separated from said air stream and falling on said sloping floor while said air stream passes out said opening in the upper end of said chamber; a gate at the lower end of said chamber; closure means for holding said gate closed except when the weight of the material which has slid down said floor and against said gate forces said gate open; an inclined slide with its high end beneath said gate to receive material passing therethrough; a duct extending out of said housing from an opening beneath and adjacent the lower end of said slide; a receptacle in said housing below said duct opening; a screen supported in said housing between the inlet opening of the outlet duct and said receptacle, so that large sized particles are caught and retained by said screen; a generally upright partition extending in front of and spaced away from the inlet end of said duct and the low end of said slide and down about to said screen; and a conduit in said housing for conducting said air stream from said chamber to a position beyond said partition and below said screen, said air stream being thereby passed through said material on its way into said duct, carrying with it the lighter material, while the heavier material falls into said receptacle, said material falling through said screen before said air current acts upon it to blow said lighter material up into said duct.

2. In a device for continuously separating comminuted materials of different specific gravities which enter said device in suspension in an air stream, the combination of: a closed housing; a cyclone chamber within said housing, having an opening in its upper end and a floor sloping toward an opening at its lower end; an air inlet pipe passing through the wall of said housing and into said chamber for carrying said air stream into said chamber, the solid materials being therein separated from said air stream and falling down said sloping floor, and out said opening at the lower end of said chamber while said air stream passes out said opening in the upper end of said chamber; an inclined slide with its high end beneath the opening at the lower end of said chamber to receive material passing therethrough; a duct extending out of said housing from an opening beneath and adjacent the lower end of said slide; a receptacle in said housing below said duct opening; a screen supported in said housing between said duct opening and said receptacle, so that large sized particles are caught and retained by said screen; a generally upright partition extending in front of and spaced away from said duct opening and the low end of said slide and down about to said screen; and a conduit in said housing for conducting said air stream from said chamber to below said screen and said partition and passing through said material below said screen, said air current acting upon it to blow the lighter material up into said duct while the heavier material falls into said receptacle.

3. In a device for continuously separating comminuted materials of different specific gravities which enter said device in an air stream, the combination of: a closed vertically extended housing; walls defining a round expansion and whirl chamber within said housing adjacent the top thereof, said chamber having an opening in its upper end and a sloping floor at its lower end; an air inlet pipe passing through the wall of said housing and into said chamber for carrying said airstream into said chamber, the solid materials being therein separated from said air stream and falling on said sloping floor while said air stream passes out said opening in the upper end of said chamber; means for preventing passage of air along the path of said solid materials; an inclined slide substantially the width of said housing with its high end beneath the low end of said sloping floor to receive the solid material therefrom; means on the slide for spreading out the solid material in a thin substantially flat sheet as it passed down said slide and by the time it falls from the slide's low end; a duct extending out through one wall of said housing, generally parallel to and beneath said slide, having an opening beneath and adjacent the lower end of said slide, said duct opening being of generally rectangular slit form, with its wide dimension extending laterally substantially the width of said slide and its narrow dimension lying generally vertically; a receptacle in said housing below said duct opening; and a generally flat rectangular conduit, substantially the width of said housing along one lateral dimension but substantially narrower along its other lateral dimension, for conducting said air stream from said chamber down along the side wall of said housing on the opposite side thereof from said outlet duct to a position opposite the opening of said duct, said air stream being thereby formed into a relatively flat sheet and passed through said thin sheet of solid material generally perpendicular thereto on its way into said duct, carrying with it the lighter material, while the heavier material falls into said receptacle.

4. The device of claim 3 in which the means for preventing the passage of air along the path of said solid materials, comprises a gate at the lower end of said sloping bottom above said slide, said gate being a flexible sheet of rubber secured only at its upper end to said chamber walls, with its lower end reaching substantially to said bottom, so that it substantially prevents the passage of air therethrough, but, because of its flexibility, its lower end will be swung by the weight of solid material against it and said solid material will fall out onto said slide.

5. The device of claim 3 wherein the lower wall of said duct includes a lip having a free edge at the said duct opening; said lip at its opposite edge having a pivotal connection with the fixed lower wall portion of the duct, said lip including a slide member adjustable lengthwise of the duct, and means for rotatably adjusting said lip about its pivotal connection.

WILLIAM H. MEAD.
LEWIS H. BISHOP.
J. STANLEY FINN.

References Cited in the file of this patent

UNITED STATES PATENTS

| Number | Name | Date |
|---|---|---|
| 39,063 | Palmer et al. | June 30, 1863 |
| 1,025,730 | Wolf | May 7, 1912 |
| 1,272,311 | Plaisted | July 9, 1918 |
| 1,506,494 | Lindsay | Aug. 26, 1924 |
| 1,530,277 | Mettler | Mar. 17, 1925 |
| 1,721,908 | Heist | July 23, 1929 |
| 1,761,627 | Hine | June 3, 1930 |
| 1,773,840 | Nattcher et al. | Aug. 26, 1930 |
| 1,903,046 | Hunter | Mar. 28, 1933 |
| 1,994,610 | Huyett | Mar. 19, 1935 |
| 2,093,446 | Huyett | Sept. 21, 1937 |
| 2,129,451 | Talmage | Sept. 6, 1938 |
| 2,203,959 | Hammack | June 11, 1940 |
| 2,247,385 | Huyett | July 1, 1941 |
| 2,384,891 | Collins et al. | Sept. 18, 1945 |